United States Patent
Nayak et al.

(10) Patent No.: US 11,165,744 B2
(45) Date of Patent: Nov. 2, 2021

(54) FASTER DUPLICATE ADDRESS DETECTION FOR RANGES OF LINK LOCAL ADDRESSES

(71) Applicant: Juniper Networks, Inc., Sunnyvale, CA (US)

(72) Inventors: Manoj Nayak, Bangalore (IN); Rafik Puttur, Dakshina Kannada (IN); Beena Krishne Gowda, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 11 days.

(21) Appl. No.: 16/234,320

(22) Filed: Dec. 27, 2018

(65) Prior Publication Data

US 2020/0213268 A1    Jul. 2, 2020

(51) Int. Cl.
*H04L 29/12* (2006.01)
*G06F 9/455* (2018.01)

(52) U.S. Cl.
CPC ...... *H04L 61/2007* (2013.01); *G06F 9/45533* (2013.01); *H04L 61/6022* (2013.01)

(58) Field of Classification Search
CPC ............................. H04L 61/2007; H04L 45/745
See application file for complete search history.

(56) References Cited

U.S. PATENT DOCUMENTS

| | | | |
|---|---|---|---|
| 6,243,749 B1 | 6/2001 | Sitaraman et al. | |
| 6,247,060 B1 | 6/2001 | Boucher et al. | |
| 6,578,074 B1 | 6/2003 | Bahlmann | |
| 6,957,276 B1 | 10/2005 | Bahl | |
| 6,982,953 B1 | 1/2006 | Swales | |
| 7,178,059 B2 | 2/2007 | Greenspan et al. | |
| 7,197,549 B1 | 3/2007 | Salama et al. | |
| 7,292,538 B1 | 11/2007 | O'Rourke et al. | |

(Continued)

FOREIGN PATENT DOCUMENTS

| EP | 3382998 A1 | 10/2018 |
|---|---|---|
| JP | 2004356920 A | 12/2004 |

(Continued)

OTHER PUBLICATIONS

Tsan-Pin Wang, Jui-Hsien Chuang Fast Duplicate Address Detection for Seamless Inter-Domain Handoff in All-IPv6 Mobile Networks. 2007, Wireless Pers Commun 42, pp. 263-275 (Year: 2007).*

(Continued)

*Primary Examiner* — Esther B. Henderson
(74) *Attorney, Agent, or Firm* — Shumaker & Sieffert, P.A.

(57) ABSTRACT

An example network device executes a plurality of virtual machines (VMs). The network device is configured to determine to assign a number of Internet protocol (IP) addresses to the plurality of VMs, the number of IP addresses being greater than two, determine a first IP address, determine a range value that is equal to or greater than the number of IP addresses, generate a message according to Duplicate Address Protocol (DAD) including data indicating that the message includes a range of addresses, the data further indicating the first IP address and the range value; and send the message according to DAD via the network interface to one or more network devices to determine whether any IP address in a range starting with the first IP address and through the range value is in use by the one or more network devices.

20 Claims, 4 Drawing Sheets

(56) References Cited

U.S. PATENT DOCUMENTS

| | | | |
|---|---|---|---|
| 7,321,893 | B1 | 1/2008 | Rambacher et al. |
| 7,386,629 | B2 | 6/2008 | Rover et al. |
| 7,533,165 | B2 | 5/2009 | Makino |
| 7,624,181 | B2 | 11/2009 | Townsley et al. |
| 7,648,070 | B2 | 1/2010 | Droms et al. |
| 7,792,942 | B1 | 9/2010 | Regan et al. |
| 7,991,863 | B2 | 8/2011 | Zhao |
| 8,036,237 | B2 | 10/2011 | Kolli et al. |
| 8,631,100 | B2 | 1/2014 | Gandhewar et al. |
| 8,792,502 | B2 | 7/2014 | Rajamanickam et al. |
| 9,166,872 | B2 | 10/2015 | Cao et al. |
| 10,601,766 | B2 | 3/2020 | Wackerly et al. |
| 10,931,628 | B2 | 2/2021 | Nayak et al. |
| 10,965,637 | B1 | 3/2021 | Nayak et al. |
| 10,992,637 | B2 | 4/2021 | Nayak et al. |
| 2001/0017857 | A1* | 8/2001 | Matsukawa ....... H04L 29/12018 370/392 |
| 2003/0076805 | A1 | 4/2003 | Agrawal et al. |
| 2004/0030769 | A1 | 2/2004 | Lim et al. |
| 2004/0081122 | A1* | 4/2004 | Koodli .............. H04W 36/0016 370/329 |
| 2004/0083306 | A1* | 4/2004 | Gloe ................. H04L 29/12066 709/245 |
| 2004/0117657 | A1 | 6/2004 | Gabor et al. |
| 2004/0148398 | A1 | 7/2004 | Park |
| 2004/0258007 | A1 | 12/2004 | Nam et al. |
| 2005/0044273 | A1 | 2/2005 | Bouchat et al. |
| 2005/0066035 | A1 | 3/2005 | Williams et al. |
| 2005/0097223 | A1 | 5/2005 | Shen et al. |
| 2005/0122946 | A1 | 6/2005 | Won |
| 2005/0132209 | A1 | 6/2005 | Hug et al. |
| 2005/0235000 | A1 | 10/2005 | Keil |
| 2005/0253718 | A1 | 11/2005 | Droms et al. |
| 2005/0253722 | A1 | 11/2005 | Droms et al. |
| 2006/0020796 | A1 | 1/2006 | Aura et al. |
| 2006/0020807 | A1 | 1/2006 | Aura et al. |
| 2006/0031488 | A1 | 2/2006 | Swales |
| 2006/0047791 | A1 | 3/2006 | Bahl |
| 2006/0155563 | A1 | 7/2006 | Banerjee et al. |
| 2006/0221846 | A1 | 10/2006 | Dyck et al. |
| 2006/0239266 | A1 | 10/2006 | Babbar et al. |
| 2007/0002833 | A1 | 1/2007 | Bajic |
| 2007/0073882 | A1 | 3/2007 | Brown et al. |
| 2007/0180499 | A1 | 8/2007 | Van Bemmel |
| 2007/0203999 | A1 | 8/2007 | Townsley et al. |
| 2007/0214352 | A1 | 9/2007 | Convery et al. |
| 2007/0275726 | A1 | 11/2007 | Lee et al. |
| 2008/0046597 | A1 | 2/2008 | Stademann et al. |
| 2008/0065747 | A1 | 3/2008 | Kubota |
| 2008/0159222 | A1 | 7/2008 | Akram et al. |
| 2009/0154406 | A1 | 6/2009 | Kim et al. |
| 2009/0257425 | A1 | 10/2009 | Sastry et al. |
| 2010/0042707 | A1 | 2/2010 | Zhao |
| 2010/0042714 | A1 | 2/2010 | Choi et al. |
| 2010/0191813 | A1 | 7/2010 | Gandhewar et al. |
| 2010/0191839 | A1 | 7/2010 | Gandhewar et al. |
| 2010/0214959 | A1 | 8/2010 | Kuehnel et al. |
| 2010/0218247 | A1 | 8/2010 | Nice et al. |
| 2010/0272107 | A1 | 10/2010 | Papp et al. |
| 2010/0274924 | A1 | 10/2010 | Allan et al. |
| 2011/0004673 | A1 | 1/2011 | Kitamura |
| 2012/0023207 | A1 | 1/2012 | Gandhewar et al. |
| 2012/0250627 | A1 | 10/2012 | McCormack et al. |
| 2013/0286854 | A1 | 10/2013 | Cao et al. |
| 2014/0044134 | A1* | 2/2014 | Rajamanickam ... H04L 61/6022 370/400 |
| 2015/0163192 | A1 | 6/2015 | Jain et al. |
| 2015/0295884 | A1 | 10/2015 | Zhao et al. |
| 2016/0112367 | A1 | 4/2016 | Thubert et al. |
| 2016/0127193 | A1 | 5/2016 | Deniaud et al. |
| 2016/0308825 | A1 | 10/2016 | Jain et al. |
| 2018/0063072 | A1 | 3/2018 | Wackerly et al. |
| 2020/0045011 | A1* | 2/2020 | Nayak ..................... G06F 9/455 |
| 2020/0099654 | A1* | 3/2020 | Jose ................... H04L 61/2007 |

FOREIGN PATENT DOCUMENTS

| | | |
|---|---|---|
| WO | 03/055180 A1 | 7/2003 |
| WO | 03/081875 A1 | 10/2003 |
| WO | 2005050897 A2 | 6/2005 |

OTHER PUBLICATIONS

Shin et al., "Simultaneous multi-DAD (SDAD) in Mobile IPv6," Department of Computer Engineering, Korea University, IEEE, date of conference: Nov. 13-16, 2008, 6 pp.

Extended Search Report from counterpart European Application No. 19181899.6, dated Nov. 27, 2019, 9 pp.

"VM Server for SPARC 3.5 Administration Guide," Oracle, Nov. 2017, 474 pp.

"Arp-scan User Guide," NTA-Wiki, Jun. 28, 2018, 13 pp.

Hladik, "linux—Fast ARP scan in address-less DAD (Duplicate Address Discovery) mode—Server Fault," Jul. 27, 2016, 2 pp.

Thomson et al., "IPv6 Stateless Address Autoconfiguration," Network Working Group, Request for Comments: 4862, Sep. 2007, 31 pp.

Narten et al., "Neighbor Discovery for IP Version 6 (IPv6)," Network Working Group, Request for Comments: 2461, Dec. 1998, 93 pp.

Moore, "Optimistic Duplicate Address Detection (DAD) for IPv6," Network Working Group, Request for Comments: 4429, Apr. 2006, 17 pp.

Narten et al., "Neighbor Discovery for IP version 6 (IPv6)," Network Working Group, Request for Comments: 4861, Sep. 2007, 97 pp.

Hinden et al., "IP Version 6 Addressing Architecture," Network Working Group, Request for Comments: 4291, Feb. 2006, 26 pp.

Cheshire, "IPv4 Address Conflict Detection," Network Working Group, Request for Comments: 5227, Jul. 2008, 22 pp.

Jose et al., "Automatic Recovery From Duplicate Network Addresses," U.S. Appl. No. 16/138,767, filed Sep. 21, 2018.

Nayak et al., "Detecting Hardware Address Conflicts in Computer Networks," U.S. Appl. No. 16/050,983, filed Jul. 31, 2018.

Nayak et al., "Duplicate Address Detection for Global IP Address or Range of Link Local IP Addresses," U.S. Appl. No. 16/234,342, filed Dec. 27, 2018.

"Address Resolution Protocol," Wikipedia, retrieved Mar. 25, 2017, 7 pp.

"Change (Spoof) MAC Address on Windows 2000. XP, 2003, Vista, 2008, Windows 7," KLC Consulting, Inc., accessed on Oct. 18, 2010, from http://www.klcconsulting.net/Change_MAC_w2k.htm, 8 pp.

"Change Mac Address," File Buzz, accessed on Oct. 18, 2010, from http://www.filebuzz.com/files/Change_Mac_Address/1.html, 4 pp.

"Gentle MAC Pro v4.0," File Buzz, accessed on Oct. 18, 2010, from http://www.filebuzz.com/fileinfo/32000/Gentle_MAC_Pro.html, 2 pp.

"IEEE Standard for Local and Metropolitan Area Networks, IEEE Std 802.1ag™-2007—Virtual Bridged Local Area Networks—Amendment 5: Connectivity Fault Management," IEEE Computer Society, LAN/MAN Standards Committee, Dec. 7, 2007, 260 pp.

"MacIP Change v1.0," File Buzz, accessed on Oct. 18, 2010, from http://www.filebuzz.com/fileinfo/36702/MacIP_Change.html, 2 pp.

"Subscriber Access Configuration Guide—Release 9.4," JUNOS® Software, Juniper Networks, Inc., Jan. 15, 2009, 38 pp.

Alexander, "DHCP Options and BOOTP Vendor Extensions," RFC 2132, Network Working Group, IETF Standard, Internet Engineering Task Force, Mar. 1997, 35 pp.

"IANA Considerations and IETF Protocol Usage," RFC 5342, IEEE, Network Working Group, Sep. 2008, 22 pp.

Droms et al., "Dynamic Heat Configuration Protocol for IPv6 (DHCPv6)," RFC 3315, Network Working Group, IETF Standard, Internet Engineering Task Force, Jul. 2003, 17 pp.

Droms, "Dynamic Host Configuration Protocol," RFC 2131, Network Working Group, IETF Standard, Internet Engineering Task Force, Mar. 1997, 46 pp.

(56) References Cited

OTHER PUBLICATIONS

Droms et al.,"An Inter-server Protocol for DHCP; draft-ietf-dhc-interserver-01.txt" Network Working Group, Internet Draft, Mar. 1997, p. 1-31.
Habets, "Arping," thomas@habets.pp.se, Jun. 21, 2003, 3 pp.
Habets, "Playing with ARP—Draft, I repeat: It's a draft," thomas@habets.pp.se, Mar. 30, 2007, 7 pp.
Hinden et al,, "IP Version 6 Addressing Architecture," RFC 2373, IEEE, Network Working Group, Jul. 1998, 24 pp.
Thomas et al., "Detecting Hardware Address Conflicts in Computer Networks," U.S. Appl. No. 15/472,832, filed Mar. 29, 2017.
McAuley et al. "Experience with Autoconfiguring a Network with IP Addresses", Proceedings: Communications for Network-Centric Operations: Creating the Information Force, Oct. 28-30, 2001, Mclean, VA, Telcordia Technologies, Inc., 2001, p. 272-276.
Patrick, "DHCP Relay Agent Information Option," RFC 3046, Network Working Group, IETF Standard, Internet Engineering Task Force, Jan. 2001, 15 pp.
Office Action from U.S. Appl. No. 16/234,342, dated May 21, 2020, 10 pp.
Office Action from U.S. Appl. No. 16/050,983, dated Jul. 28, 2020, 13 pp.
Response to Office Action dated May 21, 2020, from U.S. Appl. No. 16/234,342, filed Aug. 18, 2020, 12 pp.
Response to Office Action dated Jul. 28, 2020 from U.S. Appl. No. 16/050,983, filed Oct. 28, 2020, 17 pp.
Notice of Allowance from U.S. Appl. No. 16/234,342, dated Oct. 23, 2020, 7 pp.
Notice of Allowance from U.S. Appl. No. 16/050,983, dated Jan. 11, 2021, 8 pp.
Response to Extended Search Report dated Nov. 27, 2019 from counterpart European Application No. 19181899.6, filed Jan. 4, 2021, 12 pp.
U.S. Appl. No. 17/216,085, filed Mar. 29, 2021, naming inventors Nayak et al.

\* cited by examiner

```
                      1 1 1 1 1 1 1 1 1 1 2 2 2 2 2 2 2 2 2 2 3 3
  0 1 2 3 4 5 6 7 8 9 0 1 2 3 4 5 6 7 8 9 0 1 2 3 4 5 6 7 8 9 0 1
```

| TYPE FIELD 52 | CODE FIELD 54 | CHECKSUM FIELD 56 |
|---|---|---|
| RESERVED FIELD 58 ||| 
| TARGET LINK LOCAL ADDRESS FIELD 60 |||
| RANGE FOR POOL OF TARGET LINK LOCAL ADDRESSES FIELD 62 |||

|   |   |   | 1 1 1 1 1 1 1 1 1 1 2 2 2 2 2 2 2 2 2 2 3 3 |
|---|---|---|---|
|   |   |   | 0 1 2 3 4 5 6 7 8 9 0 1 2 3 4 5 6 7 8 9 0 1 2 3 4 5 6 7 8 9 0 1 |

| TYPE FIELD 72 | CODE FIELD 74 | CHECKSUM FIELD 76 |
|---|---|---|
| R S 0 | RESERVED FIELD 84 | |
| RESERVED LINK LOCAL ADDRESS FIELD 86 | | |
| RANGE FOR POOL OF RESERVED LINK LOCAL ADDRESSES FIELD 88 | | |
| RELEASED LINK LOCAL ADDRESS FIELD 90 | | |
| RANGE FOR POOL OF RELEASED LINK LOCAL ADDRESSES FIELD 92 | | |

FASTER DUPLICATE ADDRESS DETECTION FOR RANGES OF LINK LOCAL ADDRESSES

TECHNICAL FIELD

The techniques of this disclosure relate to computer networks and, more particularly, assignment of network addresses for use by network devices within computer networks.

BACKGROUND

A computer network is a collection of interconnected network devices that exchange data and share resources. The network devices may be implemented as physical devices, such as desktop computers, servers, and network appliances, or may be deployed as virtual devices, such as virtual machines executing on virtualization infrastructure. In some networks, such as Ethernet networks, each network interface of the virtual or physical network device is assigned a unique network address, such as an Internet protocol (IP) address. Network devices use IP addresses to determine network routes by which to send network traffic, such as packets, to network devices.

Network devices may use the Duplicate Address Detection (DAD) protocol to determine whether an Internet protocol UP) address is likely to be unique on a particular link. That is, prior to assigning an IP address to a VM, a network device may send a neighbor solicitation message including the IP address to other network devices to determine whether any of the network devices have reserved the IP address. If one of the other network devices has the IP address reserved, that network device sends a neighbor advertisement message indicating that the IP address is reserved. Thus, if the network device receives such a neighbor advertisement message, the network device may select a different IP address and send a new neighbor solicitation message to the other network devices, and repeat this process until an unreserved IP address is discovered.

SUMMARY

In general, this disclosure describes techniques for assigning Internet protocol (IP) addresses to virtual machines (VMs), in particular by detecting conflicts between selected IP addresses, in computer networks. These techniques address scenarios where logical interface identifiers are generated from media access control (MAC) addresses and where there is, for example, a one-to-one mapping between MAC addresses and interface identifiers, so that a group of MAC addresses in a range can generate a group of link local addresses in the same range. As one example, in some cases, a network device may need to assign IP addresses to multiple network devices in a short time span. This disclosure recognizes that sending individual neighbor solicitation messages for each of the IP addresses may negatively impact the network, because the overhead associated with the messages and the number of messages may consume a relatively large amount of bandwidth, and also require substantial processing by network devices receiving the messages.

Thus, according to the techniques of this disclosure, a network device may send a single extended neighbor solicitation message specifying a range of requested IP addresses for multiple network devices, as described herein. For example, the extended neighbor solicitation message may include data indicating that the extended neighbor solicitation message includes a range of requested IP addresses, and data specifying the range of requested IP addresses. The data specifying the range of requested IP addresses may specify a first IP address in the range and a number of IP addresses in the range. The data indicating that the extended neighbor solicitation message specifies the range of requested IP addresses may be a special value in a code field of the extended neighbor solicitation message, e.g., a value of "1" for the code field.

In one example, a method includes determining, by a network device, to assign a number of Internet protocol (IP) addresses to a plurality of virtual machines (VMs) executed by the network device, the number of IP addresses being greater than two; determining, by the network device, a first IP address; determining, by the network device, a range value that is equal to or greater than the number of IP addresses; generating, by the network device, a message according to Duplicate Address Protocol (DAD) including data indicating that the message includes a range of addresses, the data further indicating the first IP address and the range value; and sending, by the network device, the message according to DAD to one or more network devices to determine whether any IP address in a range starting with the first IP address and through the range value is in use by the one or more network devices.

In another example, a network device includes a memory configured to store instructions for a plurality of virtual machines (VMs); a network interface; and a processor implemented in circuitry. The processor is configured to execute the instructions for the plurality of VMs; determine to assign a number of Internet protocol (IP) addresses to the plurality of VMs, the number of IP addresses being greater than two; determine a first IP address; determine a range value that is equal to or greater than the number of IP addresses; generate a message according to Duplicate Address Protocol (DAD) including data indicating that the message includes a range of addresses, the data further indicating the first IP address and the range value; and send the message according to DAD via the network interface to one or more network devices to determine whether any IP address in a range starting with the first IP address and through the range value is in use by the one or more network devices.

In another example, a computer-readable storage medium has stored thereon instructions that, when executed, cause a processor of a network device to determine to assign a number of Internet protocol (IP) addresses to a plurality of virtual machines (VMs) executed by the network device, the number of IP addresses being greater than two; determine a first IP address; determine a range value that is equal to or greater than the number of IP addresses; generate a message according to Duplicate Address Protocol (DAD) including data indicating that the message includes a range of addresses, the data further indicating the first IP address and the range value; and send the message according to DAD via the network interface to one or more network devices to determine whether any IP address in a range starting with the first IP address and through the range value is in use by the one or more network devices.

The details of one or more embodiments of the techniques are set forth in the accompanying drawings and the description below. Other features, objects, and advantages of the techniques will be apparent from the description, drawings, and claims.

BRIEF DESCRIPTION OF DRAWINGS

FIG. 2 is a conceptual diagram illustrating an example extended neighbor solicitation message format, in accordance with one or more techniques of this disclosure.

FIG. 3 is a conceptual diagram illustrating an example extended neighbor advertisement message format 70, in accordance with one or more techniques of this disclosure.

DETAILED DESCRIPTION

Figure 1:
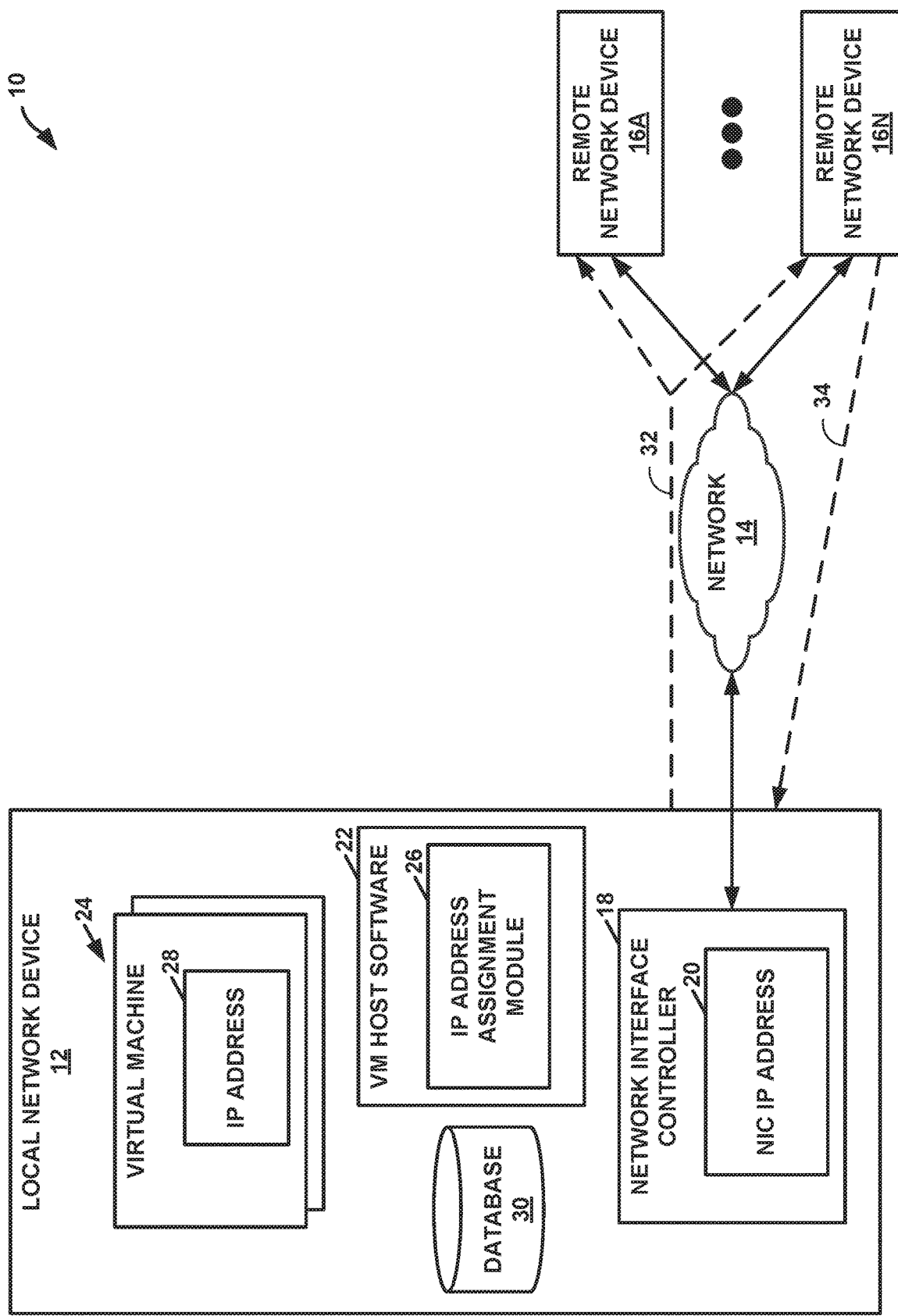
FIG. 1 is a block diagram illustrating an exemplary network system in which a local network device implements network layer address conflict detection techniques of this disclosure.

FIG. 1 is a block diagram illustrating an exemplary network system 10 in which a local network device 12 implements network layer address conflict detection techniques of this disclosure. The network layer address conflict detection techniques may be applied to detect, for example Internet protocol (IP) address conflicts. As shown in FIG. 1, network system 10 comprises local network device 12, a network 14, and remote network devices 16A-16N (collectively, "remote network devices 16"). Local network device 12 is "local" in the context of this disclosure in the sense that this disclosure describes local network device 12 as being an initiating device of the IP address conflict detection techniques of this disclosure. Likewise, remote network devices 16 are "remote" in the context of this disclosure in the sense that remote network devices 16 are remote from local network device 12. As described in more detail, local network device 12 is an example of a requesting network device, and remote network devices 16 are examples of responding network devices.

Local network device 12 may comprise various types of computing devices. For example, local network device 12 may comprise a server computer, a blade server, a personal computer, a mobile computing device (e.g., a tablet computer, smartphone), an intermediate network device (e.g., a router, gateway, intrusion detection device), or another type of network-equipped computing device. Remote network devices 16 each may comprise similar types of network-equipped computing devices.

Network 14 may comprise various devices and network links that facilitate communication among local network device 12 and remote network devices 16. For instance, network 14 may comprise one or more hubs, repeaters, and/or switches. Network 14 comprises an Ethernet network or other type of network that supports broadcast communication to all network devices connected to network 14 and relies on each device having a unique address. For ease of explanation, this disclosure primarily discusses network 14 as an Ethernet network.

As shown in the example of FIG. 1, local network device 12 comprises a network interface controller (NIC) 18. NIC 18 comprises a computer hardware component that connects local network device 12 to network 14. In some examples, NIC 18 is built into a motherboard of local network device 12. NIC 18 has a NIC IP address 20. For instance, IP address 20 may be stored in a memory unit (e.g., a read only memory (ROM) unit, programmable read only memory (PROM), electrically-erasable programmable read only memory (EEPROM)) of NIC 18. In other examples, other network layer addresses may be substituted for NIC IP address 20. NIC IP address 20 may be assigned by a dynamic host configuration protocol (DHCP) server (not shown).

When communicating on network 14, a network device may transmit a message (hereinafter referred to as a "packet") that specifies a source IP address, a destination IP address, a source port, a destination port, and a protocol. The source IP address of the packet is the IP address of the transmitting network device, while the destination IP address of the packet is the IP address of the network device to which the packet is being sent. Sending the source IP address in the packet may allow a receiving network device to respond by sending a packet back to the initial transmitting device, as well as to determine appropriate network routes by which to forward the packet. The destination IP address of a frame identifies an intended receiver of the packet. The protocol field of a packet identifies a communication protocol of the payload of the packet.

Furthermore, as shown in the example of FIG. 1, local network device 12 may comprise virtual machine (VM) host software 22. VM host software 22 may comprise various types of software systems that host VMs 24. For example, VM host software 22 may comprise an operating system. In another example, VM host software 22 may comprise a hypervisor.

In this disclosure, VM host software 22 and an IP address assignment module (IAAM) 26 of VM host software 22 may execute on processing circuitry of local network device 12, and may configure the processing circuitry to perform the example techniques described in this disclosure. For example, memory of local network device 12 may store computer-readable instructions for VM host software 22 and IAAM 26 that the processing circuitry retrieves and executes. In some examples, the processing circuitry loads the instructions to become configured to perform the example operations described in this disclosure. In some examples, the processing circuitry may be a combination of fixed-function circuitry (e.g., having immutable operations) and programmable circuitry. For example, the processing circuitry may include one or more processors, and the processors will include programmable cores and fixed-function circuitry, as one example.

In general, each of VMs 24 is an emulation of a respective computer system. Since each of VMs 24 emulates a respective computer system, each of VMs 24 should have a respective IP address for use in communicating on network 14. Accordingly, IAAM 26 may, assign a respective IP address 28 to each respective VM 24. Subsequently, when MC 18 receives a packet specifying an IP address of a VM as the destination address, VM host software 22 accepts the frame and forwards the frame to the VM. When a VM generates a frame for transmission on network 14, the frame specifies the IP address of the VM as the source address of the frame, VM host software 22 then passes the frame to NIC 18 for transmission on network 14.

Local network device 12 may generate interface identifiers using one of the following methods, in some examples. According to some RFCs, an interface identifier can be generated through some other means (e.g., at random), and there is no one-to-one mapping between interface identifier and MAC address. This random generation of interface identifier is done to handle security issues, per these RFCs. For example, laptops connected to a network can reveal a person's location if an interface identifier and a link local address are generated from a MAC address. This disclosure does not address this scenario where interface identifier is not mapped to MAC address. However, these security issues are not relevant when many thousands of VMs are located inside a lab.

EUI64 methods have been used to generate interface identifiers from IEEE 48 bit MAC identifiers as per rfc2373. Link-Local IPv6 Unicast Addresses may be generated using interface identifiers, as per RFC4291. Thus, there may be a one-to-one mapping between interface identifier and MAC address. However, there are other scenarios, where interface identifiers are generated from IEEE 48 bit MAC identifiers or some other information related to logical interface. For example, a router may configure thousands of IFLs and generate interface identifiers for those Ins using a combination of MAC address and IFL index. As IFL indexes are in a range from 0-64 k, the interface identifier and corresponding link local addresses are in the same range. This disclosure addresses the scenario where an interface identifier is mapped to a MAC address.

As previously discussed, according to the duplicate address detection (DAD) protocol, a network device typically determines whether individual IP addresses are reserved one at a time. Details regarding the use of DAD are described in, e.g., Jose et al., "AUTOMATIC RECOVERY FROM DUPLICATE NETWORK ADDRESSES," U.S. application Ser. No. 16/138,767, filed Sep. 21, 2018, the entire contents of which are hereby incorporated by reference. DAD is also described in S. Thomson et al., "IPv6 Stateless Address Autoconfiguration," Network Working Group Request for Comments (RFC) 4862, September 2007, the entire contents of which are incorporated herein by reference. However, determining whether link local addresses are duplicates each time a new VM is spun-up can be time intensive and negatively impact the amount of time the VMs need to wait before being able to transmit and receive communication. In accordance with one or more examples, a requesting network device determines whether a plurality of link local addresses is available to be reserved with a single request, thereby reducing the amount of time needed reserve link local addresses.

As noted above, local network device 12 may execute multiple (e.g., two or more) VMs 24. In some cases, local network device 12 may begin execution of multiple VMs 24 (sometimes referred to as "spinning up" the VMs) simultaneously, i.e., generally (approximately) concurrently in time so that the operations overlap, or are close to overlapping, in time, such as within a few seconds or minutes of each other. Rather than determining whether potential IP addresses for the newly executed VMs are unique one-by-one as conventionally performed using, e.g., duplicate address detection (DAD), local network device 12 may perform the techniques of this disclosure to determine whether a range of IP addresses for the multiple VMs 24 is reserved, e.g., by any of remote network devices 16. Furthermore, local network device 12 reserves the range of IP addresses for VMs 24 after having determined that the range of IP addresses are not currently reserved.

This disclosure describes an enhancement to DAD protocol that may detect the presence of duplicate link local addresses being present in a network. For instance, in one or more examples, a requesting network device may, with a single request, reserve a plurality of link local addresses that the requesting network device determined are not duplicate local addresses.

In this way, when new VMs are spun-up (e.g., instantiated), the requesting network device (e.g., local network device 12) can assign the new VMs link local addresses from the reserved plurality of link local addresses without needing to determine whether the link local addresses that are to be assigned to the VMs are duplicates.

As one example, assume VM host software 22 is to instantiate three VMs 24. In some techniques, IAAM 26 would select IP addresses for each of the three VMs 24, and determine whether the three selected IP addresses are unique or are duplicates of reserved IP addresses. According to the techniques of this disclosure, local network device 12 may send a single message (e.g., single extended neighbor solicitation message 32) specifying a first one of the IP addresses and a range of the IP addresses and send this message to remote network devices 16. Local network device 12 may use any responses from remote network device 16 to this message to determine whether any of the IP addresses in the range is reserved. In some examples, remote network devices 16 may release a previously reserved IP address if the previously reserved IP address is no longer needed. Remote network devices 16 may send extended neighbor advertisement messages, such as extended neighbor advertisement message 34, specifying one or more reserved IP addresses and/or one or more released IP addresses in response to the message from local network device 12.

Furthermore, local network device 12 may use these techniques to reserve a number of IP addresses in advance of actually needed the IP addresses for assignment to VMs 24. For example, when local network device 12 (which may be a router) configures thousands of IFLs and generates interface identifiers for those IFLs using a combination of MAC address and IFL index, local network device 12 can assign the new Ins link local addresses from the reserved plurality of link local addresses without needing to determine whether the link local addresses that are to be assigned to the IFLs are duplicates.

Determining whether link local addresses are duplicates each time Router configures IFLs can be time intensive and negatively impact the amount of time the IFLs need to wait before being able to transmit and receive communication. In accordance with one or more examples of this disclosure, local network device 12 determines whether a plurality of link local addresses is available to be reserved with a single request, thereby reducing the amount of time needed to reserve link local addresses.

In some examples, neighbor solicitation and neighbor advertisement messages may generally conform to the format of, e.g., Narten et al., "Neighbor Discover for IP version 6 (IPv6)," Network Working Group, RFC 4861, September 2007, available at tools.ietf.org/html/rfc4861. According to RFC 4861, such messages include, inter cilia, a type field and a code field. The type field of a neighbor solicitation message per RFC 4861 is a value of "135," while the type field of a neighbor advertisement message per RFC 4861 is a value of "136." RFC 4861 defines neighbor solicitation and neighbor advertisement messages for a single IP address as having a code value of "0."

In accordance with the techniques of this disclosure, local network device 12 may form an extended neighbor solicitation message 32 including data that specifies that extended neighbor solicitation message 32 includes a range of IP addresses, e.g., by setting the value of the code field to "1." Likewise, in accordance with the techniques of this disclosure, local network device 12 may determine that a neighbor advertisement message having a value of "1" in a code field thereof is an extended neighbor advertisement message, such as extended neighbor advertisement message 34, in response to an extended neighbor solicitation message 32 including a range of IP addresses, and that extended neighbor advertisement message 34 indicates one or more IP addresses that are currently reserved by one of remote network devices 16. Furthermore, extended neighbor advertisement message 34 may, additionally or alternatively, specify one or more previously reserved IP addresses that are being released by one of remote network devices 16.

Network devices such as local network device 12 send extended neighbor solicitation messages, such as extended neighbor solicitation message 32, to remote network devices 16 to determine whether link local addresses of a target node are duplicates or not. Local network device 12 may multicast such extended neighbor solicitation messages to a multicast group including remote network devices 16 when local network device 12 needs to resolve the link local addresses. Thus, before sending extended neighbor solicitation message 32, local network device 12 may join the all-nodes multicast address and the solicited-node multicast address of the target address. The former may ensure that local network device 12 receives extended neighbor advertisements from other nodes already using the address, while the latter may ensure that two nodes attempting to use the same address simultaneously should detect each other's presence.

Local network device 12 may iteratively determine IP addresses (e.g., link-local IP addresses) that are not currently reserved by any of remote IP addresses 16 by using such extended neighbor solicitation and extended neighbor advertisement messages. For example, local network device 12 may, in response to an indication of a reserved IP address, generate a new extended neighbor solicitation message starting from a new IP address that is not currently reserved for the full range as previously requested. Alternatively, local network device 12 may determine a portion of the previously requested range of IP addresses that is not reserved (or previously reserved and released), and submit a new extended neighbor solicitation message for a smaller range of IP addresses that were reserved and not released.

In a first step, IAAM 26 generates a request message specifying NIC IP address 20. IAAM 26 also includes a target IP address and a range of target IP addresses. The target IP address may be a IP address that IAAM 26 plans to reserve for assigning to one of VMs 24, and the range of IP addresses may be N number of consecutive IP addresses, where N is a number greater than or equal to 1. The target IP address may be the starting IP address of the range of IP addresses. As one example, the target IP address is 0, and the range is 64, meaning that IAAM 26 plans to reserve IP addresses 0 to 63.

As another example, RAM 26 specifies the starting and ending IP addresses (e.g., IP address 10 to 19). This example is another way in which IAAM 26 specifies a range of IP addresses starting from a target IP address. For instance, in this example, the target IP address is 10 and the range is 10. There may be other ways in which to specify a range of IP addresses staring from a target IP address, and the example techniques are not limited to the specific examples provided above.

There may be various ways in which IAAM 26 determines the target IP address and the range of IP addresses. As one example, IAAM 26 determines the target IP address using a random number generator for the last two bytes, and the first six bytes are based on manufacturer of NIC 20 or based on pre-configuration of VM host software 22. IAAM 26 may be pre-configured with a value of N that defines the consecutive IP addresses IAAM 26 should reserve (e.g., N is pre-configured as 64 or 256). As another example, VM host software 22 may track a rate of how many VMs 24 are being spun-up and how many VMs 24 are being brought down, and IAAM 26 may determine the value of N based on the tracked rate. If on average, based on the tracked rate, X number of VMs 24 are executing on local network device 12, then IAAM 26 may determine a value of N that is greater than or equal to X. There may be other ways in which to determine the range of the IP addresses, and the example techniques are not limited to the above examples.

For instance, physical configuration of local network device 12 allows creation of a certain number of VMs 24 with specified number of Virtual network interface controller for each VM 24. These configurations are based on the number of physical Network interface controllers 18 and capacity of each physical network interface controller 18 in terms of bandwidth.

A Network Administrator of local network device 12 may determine how many VMs 24 need to be created with certain number of virtual network interface controller for each VM 24 to achieve successful operation of VMs 24 for a predefined load.

For example, local network device 12 has two physical network interface controllers 18 and each physical Network interface controller 18 capacity is Ribs (Giba-bits per second). So total network capacity available with local network device 12 is 16 Gbs. If each of the VMs 24 is expected to own 2 Gbs network capacity to execute a predefined operation then 8 VMs 24 can be created out of a single local network device 12. Each of these 8 VMs 24 can have one Virtual network interface controller. Therefore, total number of virtual interface controller is 8. In this example, suppose number of virtual network interface controller decided for a local network device 12 is X. Then X number of IP addresses need to be reserved by IAAM 26. However actual VMs 24 in operation at certain point of time may be less than the total number of VMs 24 created on local network device 12. These VMs 24 use less number of Virtual network interface controller, which is less than X.

IAAM 26 then instructs NIC 18 to send, via network 14, a packet comprising the request message and having a destination address field specifying Solicited-Node Multicast address as mentioned in the RFC 4861. Thus, each network device connected to network 14 (e.g., remote network devices 16, already configured VMs 24) and joined to Solicited-Node Multicast address may receive and accept the packet. In some examples, a source IP address field of the packet may specify unspecified address ::/0, as mentioned in the RFC 4861.

In response to receiving the frame, a network device determines whether a IP address or group of consecutive IP addresses of the network device matches IP addresses in the range of IP addresses. As an example, remote network device 16A may have reserved IP addresses for assigning to the VMs that execute on remote network device 116A. In this example, the IAAM of remote network device 16A may determine whether any of the IP addresses reserved for VMs that execute on remote network device 16A are within the range of IP addresses specified by IAAM 26. For instance, the IAAM of remote network device 16A may determine whether a group of consecutive IP addresses, which are part of the IP addresses reserved by remote network device 16A, are within the range of IP addresses specified by local network device 12.

In response to determining that remote network device 16A reserved a group of IP addresses within the range of addresses specified in the request message, remote network device 16A generates a response message. In one example, the response message specifies a range of IP addresses starting from a response IP address that are reserved by remote network device 16A. The range of IP addresses starting from the response IP address partially or fully overlap the range of IP addresses starting from the target IP address specified by local network device 12.

As an example, local network device 12 may specify the target IP address as 10 and the range of IP addresses as 10 (e.g., local network device 12 is reserving addresses 10 to 19). Remote network device 16A may determine that remote network device 16A had previously reserved IP addresses 5 to 24. In this example, remote network device 16A determines that the IP addresses reserved by remote network hardware device 16A partially or fully (fully, in this example) overlap the IP address range of 10 to 19, requested to be reserved by local network device 12. In this example, remote network device 16A generates a response message indicating that remote network device 16A reserved IP addresses 5 to 24.

In some examples, although remote network device 16A reserved IP addresses that fully or partially overlap the range of IP addresses starting from the target IP address requested by local network device 12, remote network device 16A may determine that some of the overlapping IP addresses can be released for use by local network device 12. For instance, keeping with the previous example, remote network device 16A may determine that remote network device 16A can release IP addresses 10 to 14, so that remote network device 16A would still reserve IP addresses 5-9 and 15-24, but 10-14 would be available for local network device 12. In this example, remote network device 16A generates a response message indicating that remote network device 16A is releasing IP addresses 10-14 and keeping in reserve IP addresses 5-9 and 15-24.

Local network device 12 may utilize various factors to determine which ones and how many reserved addresses can be released. Assume that IAAM 26 reserved X number of addresses. As one example, VM host software 22 may track a rate of how many VMs 24 are being spun-up and how many VMs 24 are being brought down, and IAAM 26 may determine the value of N based on the tracked rate. If on average, based on the tracked rate, N number of VMs 24 are executing on local network device 12, then (X-N) of IP address can be released by IAAM 26.

For example, X is max number of VMs 24 designed for local network device 12, and X number of IP addresses are reserved by IAAM 26. However actual VMs 24 in operation at certain point of time is less than the total number of VMs 24 created on local network device 12. So these VMs 24 uses less number of Virtual network interface controller than X. Accordingly, IAAM 26 may release (X-N) IP addresses.

Remote network device 16A then sends, on network 14, a packet comprising the response message. In some examples, a destination IP address of the packet specifies the Solicited-Node Multicast address. In some examples, the node that receives the Extended Neighbor Solicitation has an interface address that matches the target address in the received Extended Neighbor Solicitation, may send an Neighbor Advertisement back by setting the destination address to the tentative address or target address. An IP address remains in tentative address or tentative state until the IP address is verified to be non-duplicate one through Neighbor Solicitation message. On the other hand, in response to determining that none of the IP addresses reserved by remote network device 16A are within the range of the IP addresses specified by local network device 12, remote network device 16A does not generate a response message.

If IAAM 26 does not receive a response message specifying a range of IP addresses that partially or fully overlap the range of IP addresses starting with the target IP address specified by IAAM 26, IAAM 26 may determine that all IP addresses within the range of IP addresses starting with the target IP address are available (e.g., not duplicative). IAAM 26 may then reserve all IP addresses within the range of IP addresses starting with the target IP address (e.g., store information indicating the reserved IP addresses in database 30).

If IAAM 26 receives one or more response messages that together specify that all addresses specified b IAAM 26 are reserved by other network devices, IAAM 26 may select a new, different target hardware device, and perform the examples of the above procedure with the new target hardware device. For instance, assume IAAM 26 specified 64 IP addresses. It is possible that remote network device 16A had reserved 10 IP addresses that overlap the 64 IP addresses specified by IAAM 26, and remote network device 16A may have send a response message indicating the 10 IP addresses. Remote network device 16B may have reserved 54 IP addresses that overlap the 64 IP addresses specified by IAAM 26, and remote network device 16B may have send a response message indicating the 54 IP addresses. It is also possible that either one of remote network device 16A or 16B had reserved all of the 64 IP addresses specified by local network device 12. In either example, local network device 12 may determine that none of the 64 IP addresses local network device 12 specified are available. Local network device 12 may start with a new, different target IP address and repeat the above example procedures.

In some examples, IAAM 26 receives one or more response messages that specify a group of IP addresses that overlap with the range of IP addresses specified by local network device 12. For instance, remote network device 16A may send a response message indicating that 10 IP addresses overlap the 64 IP addresses specified by local network device 12, and remote network device 16B may not send any response. In this example, local network device 12 may reserve the 54 non-overlapping IP addresses (e.g., a subset of the IP addresses specified by local network device 12). IAAM 26 may determine whether additional IP addresses are needed, and if needed, repeat the above procedure starting from a new target IP address.

In some examples, IAAM 26 receives one or more response message that specify a group of IP addresses that overlap with the range of IP addresses specified by local network device 12, but further specify a group of IP addresses being released by the responding network device. For example, remote network device 16A may release some of the IP addresses that remote network device 16A has reserved that are within the range of IP addresses specified by local network device 12. Local network device 12 may reserve those IP addresses released by remote network device 16A.

Although the above examples are described with respect to remote network device 16A, the other network devices on network system 10 operate similarly. For instance, remote network device 16B operates similar to remote network device 16A. Also, the techniques are described with respect to local network device 12. However, the techniques described in this disclosure may be performed by any and all of the network devices of network system 10. For instance, from perspective of remote network device 16A, remote network device 16A is a local network device, and local network device 12 is a remote network device.

Thus, in the example of FIG. 1, a network device (e.g., local network device 12) may determine a range of IP addresses starting from a first target IP address (e.g., a MAC address). Additionally, the network device may send a first request message on network 14, the first request message specifying the range of IP addresses starting from the target IP address. The network device may determine whether the network device has received one or more response messages from one or more other network devices (e.g., remote network devices 16A or 16B) of the plurality of network devices specifying one or more IP addresses within the range of IP addresses within a time limit. The network device may determine, based on whether the network device received the one or more response message, whether at least a subset of the IP addresses within the range of IP addresses is available, and reserve IP addresses based on the determination of whether at least the subset of IP addresses is available. The network device may execute one or more VMs 24, and assign one or more of the reserved IP addresses to each of the one or more VMs.

Furthermore, in the example of FIG. 1, a network device (e.g., local network device 12, one of remote network devices 16) may receive a request message specifying a range of IP addresses starting from a target IP address. The network device may determine whether a group of consecutive IP addresses of the network device match a subset of the range of IP addresses. In response to determining that the group of consecutive IP addresses of the network device match the subset of the range of IP addresses, the network device may send a response message specifying the group of consecutive IP addresses.

In the example of FIG. 1, local network device 12 may comprise a database 30. Database 30 may store data indicating reserved IP addresses of network devices connected to network 14, e.g., IP addresses reserved by remote network devices 16. VM host software 24 (e.g., IAAM 26) may add entries to database 30 specifying IP addresses in response to receiving response messages specifying the IP addresses, in response to successfully reserving IP addresses for VMs 24, or in response to other events.

FIG. 2 is a conceptual diagram illustrating an example extended neighbor solicitation message format 50, in accordance with one or more techniques of this disclosure. Extended neighbor solicitation message 32 of FIG. 1 may conform to extended neighbor solicitation message format 50. As shown in FIG. 2, extended neighbor solicitation message format 50 includes type field 52, code field 54, checksum field 56, reserved field 58, target link local address field 60, and range for pool of target link local addresses field 62. Extended neighbor solicitation messages conforming to extended neighbor solicitation message format 50 of FIG. 2 may be ICMP V6 messages, including an IP header (not shown). The IP header may include a source address, which is either an address assigned to the interface from which this message is sent or (if Duplicate Address Detection is in progress) the unspecified address, and a destination address, which is either the solicited-node multicast address to the target address, or the target address. The IP header may also specify a hop limit of 255.

In one example, type field 52 has a value of "135," code field 54 has a value of "1," and checksum field 56 has a value representing an ICMP checksum. Reserved field 58 represents a field that is reserved for later use, e.g., for additional extensions. In one example, the value of reserved field 58 must be initialized to zero and ignored by a receiving device. Target link local address field 60 has a value representing a link local IP address of a target of an extended neighbor solicitation message. Range for pool of target link local addresses field 62 has a value representing a range of link local addresses starting from the target link local IP address specified in target link local address field 60.

Accordingly, local network device 12 may construct an extended neighbor solicitation message conforming to extended neighbor solicitation message format 50 of FIG. 2. That is, local network device 12 may construct an extended neighbor solicitation message including a value of "135" for type field 52, a value of "1" for code field 54 (indicating that the extended neighbor solicitation message specifies a range of IP addresses), a checksum value in checksum field 56, and a value of zero for reserved field 58. Local network device 12 may also determine a first IP address in a range of IP addresses to be reserved for a plurality of VMs 24 that are to be spun up. Local network device 12 may assign the value of the first IP address to target link local address field 60 and a value representing the range to range for pool of target link local addresses field 62.

FIG. 3 is a conceptual diagram illustrating an example extended neighbor advertisement message format 70, in accordance with one or more techniques of this disclosure. Extended neighbor advertisement message 34 of FIG. 1 may conform to extended neighbor advertisement message format 70. Extended neighbor advertisement message format 70 of FIG. 3 includes type field 72, code field 74, checksum field 76, router flag (R) field 78, solicited flag (S) field 80, override flag (0) field 82, reserved field 84, reserved link local address field 86, range for pool of reserved link local addresses field 88, released link local address field 90, and range for pool of released link local addresses field 92. Extended neighbor advertisement messages conforming to extended neighbor advertisement message format 70 of FIG. 3 may be ICMP V6 messages, including an IP header (not shown). The IP header includes a source address, which includes an address assigned to the interface from which the advertisement is sent, and a destination address. For solicited advertisements, the source address of an invoking Neighbor Solicitation or, if the solicitation's Source Address is the unspecified address, the all-nodes multicast address. The IP header may also include a hop limit of 255.

In one example, type field 72 has a value of "136," code field 74 has a value of "1," and checksum field 76 has an ICMP checksum value. When set, the value of R field 78 indicates that the sender is a router. The value of R field 78 may be used by devices performing Neighbor Unreachability Detection to detect a router that changes to a host. When set, the value of S flag 80 indicates that the advertisement was sent in response to a Neighbor Solicitation from the Destination address. The S-bit may be used as a reachability confirmation for Neighbor Unreachability Detection. It may not be set in multicast advertisements or in unsolicited unicast advertisements. When set, the value of O flag 82 indicates that the advertisement should override an existing cache entry and update the cached link-layer address. When the value of O flag 82 is not set, the advertisement will not update a cached link-layer address, though it will update an existing Neighbor Cache entry for which no link-layer address is known. The value of O flag 82 may not be set in solicited advertisements for anycast addresses and in solicited proxy advertisements. The value of O flag 82 may be set in other solicited advertisements and in unsolicited advertisements.

Reserved field 84 is a 29-bit field in the example of FIG. 3. Reserved field 84 has a value of zero in some examples and is reserved for future use. Local network device 12 may ignore the value of reserved field 84.

Reserved link local address field 86 has a value that specifies a link local address that one of remote network devices 16 has already reserved. Upon receiving an extended neighbor solicitation message, the one of remote network devices 16 may send an extended neighbor advertisement message to informs other hosts (e.g., local network device 12 and other remote network devices 16) that such address is not available for use.

Range for pool of reserved link local addresses field 88 has a value that specifies a set of addresses starting from the value of reserved link local address field 86. Remote network devices 16 may use this field to inform other hosts (e.g., local network device 12 and other remote network devices 16) that the set of link local addresses are not available for use in a single extended neighbor advertisement message.

Released link local address field 90 has a value that specifies a link local address that a host (e.g., one of remote network devices 16) plans to release. Upon receiving an extended neighbor advertisement message, local device 12 that originally sent the extended neighbor solicitation message can reserve such released link local address for future usage.

Range for pool of released link local addresses field 92 has a value that specifies a set of addresses starting from the IP address of released link local address field 90. Remote network devices 16 may use uses this field to inform other hosts (e.g., local network device 12 and other remote network devices 16) that a set of link local addresses are available for use with a single extended neighbor advertisement message.

In general, remote network devices 16 may receive an extended neighbor solicitation message, e.g., in accordance with extended neighbor solicitation message format 50 of FIG. 2, from local network device 12 specifying a range of IP addresses (such as link local IP addresses) that local network device 12 is requesting to reserve. In accordance with the techniques of this disclosure, if one of remote network devices 16 does not have any of the IP addresses reserved, the one of remote network devices 16 may ignore the extended neighbor solicitation message.

However, if one of remote network devices 16 has one or more of the IP addresses reserved, the one of remote network devices 16 constructs an extended neighbor advertisement message, e.g., in accordance with extended neighbor advertisement message format 70 of FIG. 3. In particular, the one of remote network devices 16 has one or more of the IP addresses of a received extended neighbor solicitation message reserved, the one of remote network devices 16 may determine whether to release the IP addresses or indicate that the IP addresses are reserved to local network device 12 using an extended neighbor advertisement message.

In particular, if the one of remote network devices 16 determines that one or more of the IP addresses that were previously reserved are no longer needed, the one of remote network devices 16 constructs an extended neighbor advertisement message specifying a first released IP address in released link local address field 90, and a range value representing a range of released IP addresses starting from the first released IP address in range for pool of released link local addresses field 92.

Additionally or alternatively, if the one of remote network devices 16 determines that one or more of the IP addresses that were requested in the extended neighbor solicitation message are currently reserved and must remain reserved, the one of remote network devices 16 may specify a first reserved IP address in reserved link local address field 86, and a range value representing a range of reserved IP addresses starting from the first reserved IP address in range for pool of reserved link local addresses field 88.

Based on receiving an extended neighbor advertisement message specifying a group of link local addresses within a range of link local addresses that are to be released, local network device 12 may determine that at least a subset of the link local addresses is available, excluding the group of link local addresses specified by the responding network device that are reserved. Accordingly, in some examples, local network device 12 may reserve the subset of link local addresses.

In some examples, the group of link local addresses specified as reserved by one or more of remote network devices 12 in response to an extended neighbor solicitation message includes all link local addresses within the range of link local addresses of the extended neighbor solicitation message. In such examples, local network device 12 determines whether there are any duplicates in a range of link local addresses starting from a different target link local address, and may repeat these example operations until local network device 12 determines link local addresses that are available.

In some examples, in response to receiving an extended neighbor solicitation message specifying a range of requested link local addresses, one of remote network devices 16 may determine one or more link local addresses reserved by the one of remote network devices 16 are within the range of requested link local addresses. However, the one of remote network devices 16 may determine that some of the link local addresses that the one of remote network devices 16 reserved can be released (e.g., because the one of remote network devices 16 determines that all linked local addresses are not needed).

In such examples, the one of remote network devices 16 may transmit an extended neighbor advertisement message identifying which ones of the link local addresses the one of remote network devices 16 is releasing, and which ones of the link local addresses the one of remote network devices 16 is having conflict/overlap and keeping in reserved. In response, local network device 12 may reserve the released link local addresses. If local network device 12 determines that additional link local addresses are needed, local network device 12 may transmit another extended neighbor solicitation message that specifies a range of link local addresses starting from a different, target link local address, and repeat these example operations until local network device 12 reserves sufficient link local addresses.

Figure 4:
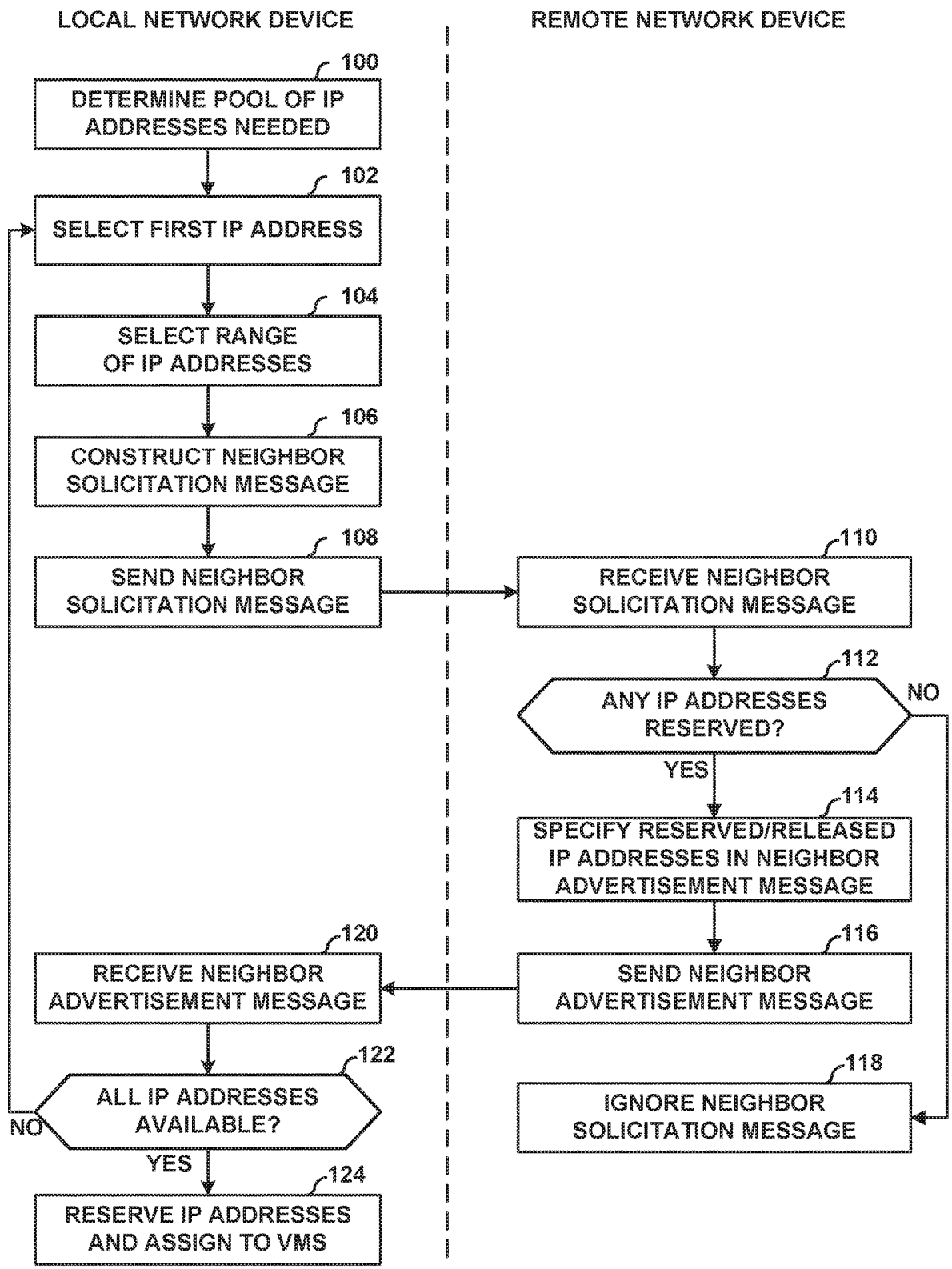
FIG. 4 is a flowchart illustrating an example method by which a network device may reserve a pool of IP addresses for a plurality of virtual machines (VMs).

FIG. 4 is a flowchart illustrating an example method by which a network device local network device 12) may reserve a pool of IP addresses for a plurality of virtual machines (VMs), e.g., VMs 24. The method of FIG. 4 is explained with respect to local network device 12 and remote network device 16A of FIG. 1. However, it should be understood that other devices may perform these or similar techniques. For example, each of remote network devices 16 may perform the elements attributed to the remote network device of FIG. 4.

Initially, local network device 12 determines a pool of IP addresses that are needed (100). In particular, local network device 12 determines a number of IP addresses that are needed. For example, local network device 12 may determine a number of new VMs that are to be instantiated or that are likely to be instantiated in the near future.

Local network device 12 may then select a first IP address to be requested (102) and select a range of IP addresses (104). For example, as discussed with respect to FIG. 1, local network device 12 maintains database 30 including entries for reserved IP addresses, e.g., IP addresses reserved by remote network devices 16. Local network device 12 may select the first IP address and the range of IP addresses to include a number of IP addresses that is equal to or greater than the number of needed IP addresses as determined above, and such that the range of IP addresses includes IP addresses that are not reserved as indicated in database 30.

Local network device 12 then constructs a neighbor solicitation message (106). The neighbor solicitation message may conform to extended neighbor solicitation message format 50 of FIG. 2. In general, local network device 12 constructs the neighbor solicitation message to include data representing the first IP address and the range of IP addresses, e.g., values for target link local address field 60 and range for pool of target link local addresses field 62. Local network device 12 then sends the neighbor solicitation message (108) to remote network devices 16. In particular, local network device 12 may send the neighbor solicitation message to an IP address associated with a broadcast or multicast group to which local network device 12 and remote network devices 16 are subscribed.

Remote network devices 16, such as remote network device 16A, may then receive the neighbor solicitation message (110). Remote network device 16A then determines whether any IP addresses in the range of IP addresses specified in the neighbor solicitation message (112). In the case that remote network device 16A does not have any of the specified IP addresses reserved ("NO" branch of 112), remote network device 16A may ignore the neighbor solicitation message (118) (e.g., by not sending a response to the neighbor solicitation message).

Assuming remote network device 16A has at least one IP address of the specified. IP addresses reserved ("YES" branch of 112), remote network device 16A may further determine whether any of the reserved IP addresses can be released (e.g., due to having been reserved but no longer in use). Remote network device 16A may then construct a neighbor advertisement message (e.g., conforming to neighbor advertisement message format 70 of FIG. 3) specifying reserved IP addresses (e.g., using values for reserved link local address field 86 and range for pool of reserved link local addresses field 88) and/or released IP addresses (e.g., using values for released link local address field 90 and range for pool of released link local addresses field 92). Remote network device 16A then sends the neighbor advertisement message to local network device 12 (116), e.g., in accordance with extended neighbor advertisement format 70 of FIG. 3. For example, remote network device 16A may send the neighbor advertisement message to the broadcast or multicast group, such that the message reaches local network device 12 and each of the other remote network devices 16.

Local network device 12 may then receive the neighbor advertisement message (120). Local network device 12 then determines whether all requested IP addresses are available (122). If there are some requested IP addresses that are not available and not released ("NO" branch of 122), local network device 12 may reserve those IP addresses that are available and repeat the process from step 102 for those IP addresses that were not available, and iterate through this process until available IP addresses for all needed IP addresses have been determined ("YES" branch of 122). Local network device 12 may then reserve the IP addresses and assign the reserved IP addresses to VMs 24 (124).

In this manner, the method of FIG. 4 represents an example of a method including determining, by a network device, to assign a number of Internet protocol (IP) addresses to a plurality of virtual machines (VMs) executed by the network device, the number of IP addresses being greater than two; determining, by the network device, a first IP address; determining, by the network device, a range value that is equal to or greater than the number of IP addresses; generating, by the network device, a message according to Duplicate Address Protocol (DAD) including data indicating that the message includes a range of addresses, the data further indicating the first IP address and the range value; and sending, by the network device, the message according to DAD to one or more network devices to determine whether any IP address in a range starting with the first IP address and through the range value is in use by the one or more network devices.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readably: medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including processing circuitry implementing one or more processors as described above, in conjunction with suitable software and/or firmware.

Various embodiments of the techniques have been described. These and other embodiments are within the scope of the following claims.

What is claimed is:

1. A method comprising:
   determining, by a network device, to assign a number of Internet protocol (IP) addresses to a plurality of virtual machines (VMs) executed by the network device, the number of IP addresses being greater than two;
   determining, by the network device, a first IP address;
   determining, by the network device, a range value that is equal to or greater than the number of IP addresses;
   generating, by the network device, a message according to Duplicate Address Detection (DAD) Protocol including data indicating that the message includes a range of addresses, wherein generating the message comprises generating the message as a single message that includes data indicating both the first IP address and the range value; and
   sending, by the network device, the message according to the DAD protocol to one or more network devices to determine whether any IP address in a range starting with the first IP address and through the range value is in use by the one or more network devices.

2. The method of claim 1, further comprising determining that at least one of the number of IP addresses in the range is in use in response to receiving an extended neighbor advertisement message specifying a reserved IP address in the range from one of the one or more network devices.

3. The method of claim 2, wherein the message comprises a first message and the range comprises a first range, the method further comprising, in response to determining that the at least one of the number of IP addresses in the range is in use:
   determining, by the network device, a second IP address different than the first IP address such that a second range of IP addresses equal to or greater than the range value and starting with the second IP address does not include the reserved IP address;
   generating, by the network device, a second message according to the DAD protocol including data indicating that the second message includes a range of addresses, the data further indicating the second IP address and the range value; and
   sending, by the network device, the second message according to the DAD protocol to the one or more network devices to determine whether any IP address in the second range is in use by the one or more network devices.

4. The method of claim 2, wherein the extended neighbor advertisement message comprises a type field having a value of 136 and a code field having a value of 1.

5. The method of claim 1, further comprising, in response to determining that none of the IP addresses in the range is in use by any of the one or more network devices, assigning the IP addresses in the range to the VMs.

6. The method of claim 5, wherein determining that none of the IP addresses in the range is in use comprises receiving an extended neighbor advertisement message from one of the one or more network devices including data indicating that one or more previously reserved IP addresses in the range has been released by the one of the one or more network devices.

7. The method of claim 1, wherein the data indicating that the message includes the range of addresses comprises a value of 1 for a code field of the message, the code field following a type field having a value of 135.

8. A network device comprising:
   a memory configured to store instructions for a plurality of virtual machines (VMs);
   a network interface; and
   a processor implemented in circuitry and configured to:
      execute the instructions for the plurality of VMs;
      determine to assign a number of Internet protocol (IP) addresses to the plurality of VMs, the number of IP addresses being greater than two;
      determine a first IP address;
      determine a range value that is equal to or greater than the number of IP addresses;
      generate a message according to Duplicate Address Detection (DAD) Protocol including data indicating that the message includes a range of addresses, wherein the processor is configured to generate the message as a single message that includes data indicating both the first IP address and the range value; and
      send the message according to the DAD protocol via the network interface to one or more network devices to determine whether any IP address in a range starting with the first IP address and through the range value is in use by the one or more network devices.

9. The network device of claim 8, wherein the processor is configured to determine that at least one of the number of IP addresses in the range is in use in response to receiving an extended neighbor advertisement message specifying a reserved IP address in the range from one of the one or more network devices.

10. The network device of claim 9, wherein the message comprises a first message and the range comprises a first range, and wherein the processor is further configured to, in response to determining that the at least one of the number of IP addresses in the range is in use:
   determine a second IP address different than the first IP address such that a second range of IP addresses equal to or greater than the range value and starting with the second IP address does not include the reserved IP address;
   generate a second message according to the DAD protocol including data indicating that the second message includes a range of addresses, the data further indicating the second IP address and the range value; and send the second message according to the DAD protocol to the one or more network devices to determine whether any IP address in the second range is in use by the one or more network devices.

11. The network device of claim 9, wherein the extended neighbor advertisement message comprises a type field having a value of 136 and a code field having a value of 1.

12. The network device of claim 8, wherein the processor is configured to, in response to determining that none of the IP addresses in the range is in use by any of the one or more network devices, assign the IP addresses in the range to the VMs.

13. The network device of claim 12, wherein the processor is configured to receive an extended neighbor advertisement message from one of the one or more network devices including data indicating that one or more previously reserved IP addresses in the range has been released by the one of the one or more network devices and determine that the one or more previously reserved IP addresses are not in use by any of the one or more network devices.

14. The network device of claim 8, wherein the data indicating that the message includes the range of addresses comprises a value of 1 for a code field of the message, the code field following a type field having a value of 135.

15. A non-transitory computer-readable storage medium having stored thereon instructions that, when executed, cause a processor of a network device to:
   determine to assign a number of Internet protocol (IP) addresses to a plurality of virtual machines (VMs) executed by the network device, the number of IP addresses being greater than two;
   determine a first IP address;
   determine a range value that is equal to or greater than the number of IP addresses;
   generate a message according to Duplicate Address Detection (DAD) Protocol including data indicating that the message includes a range of addresses, wherein the instructions that cause the processor to generate the message comprise instructions that cause the processor to generate the message as a single message that includes data indicating both the first IP address and the range value; and
   send the message according to the DAD protocol via the network interface to one or more network devices to determine whether any IP address in a range starting with the first IP address and through the range value is in use by the one or more network devices.

16. The computer-readable storage medium of claim 15, further comprising instructions that cause the processor to determine that at least one of the number of IP addresses in the range is in use in response to receiving an extended neighbor advertisement message specifying a reserved IP address in the range from one of the one or more network devices.

17. The non-transitory computer-readable storage medium of claim 16, wherein the message comprises a first message and the range comprises a first range, further comprising instructions that cause the processor to, in response to determining that the at least one of the number of IP addresses in the range is in use:
   determine a second IP address different than the first IP address such that a second range of IP addresses equal to or greater than the range value and starting with the second IP address does not include the reserved IP address;
   generate a second message according to the DAD protocol including data indicating that the second message includes a range of addresses, the data further indicating the second IP address and the range value; and
   send the second message according to the DAD protocol to the one or more network devices to determine whether any IP address in the second range is in use by the one or more network devices.

18. The non-transitory computer-readable storage medium of claim 16, wherein the extended neighbor advertisement message comprises a type field having a value of 136 and a code field having a value of 1.

19. The non-transitory computer-readable storage medium of claim 15, further comprising instructions that cause the processor to, in response to determining that none of the IP addresses in the range is in use by any of the one or more network devices, assign the IP addresses in the range to the VMs.

20. The non-transitory computer-readable storage medium of claim 19, further comprising instructions that cause the processor to receive an extended neighbor advertisement message from one of the one or more network devices including data indicating that one or more previously reserved IP addresses in the range has been released by the one of the one or more network devices and determine that the one or more previously reserved IP addresses are not in use by any of the one or more network devices.

* * * * *